United States Patent
Benedetti

(10) Patent No.: US 10,059,029 B2
(45) Date of Patent: Aug. 28, 2018

(54) SYSTEM FOR THE PRODUCTION OF PANELS MADE OF WOOD FLAKES

(71) Applicant: IMAL S.R.L., Modena (IT)

(72) Inventor: Paolo Benedetti, Modena (IT)

(73) Assignee: IMAL S.R.L., Modena (IT)

( * ) Notice: Subject to any disclaimer, the term of this patent is extended or adjusted under 35 U.S.C. 154(b) by 0 days.

(21) Appl. No.: 15/519,022

(22) PCT Filed: Oct. 13, 2015

(86) PCT No.: PCT/IB2015/057833
§ 371 (c)(1),
(2) Date: Apr. 13, 2017

(87) PCT Pub. No.: WO2016/059553
PCT Pub. Date: Apr. 21, 2016

(65) Prior Publication Data
US 2017/0225356 A1  Aug. 10, 2017

(30) Foreign Application Priority Data
Oct. 13, 2014 (IT) .............................. MO2014A0285

(51) Int. Cl.
*B07C 5/14* (2006.01)
*B27N 3/14* (2006.01)
(Continued)

(52) U.S. Cl.
CPC ................ *B27N 3/143* (2013.01); *B07B 1/14* (2013.01); *E04C 2/16* (2013.01)

(58) Field of Classification Search
CPC ................................... B07B 1/14; E04C 2/16
(Continued)

(56) References Cited

U.S. PATENT DOCUMENTS

| 2,737,997 A | * | 3/1956 | Himmelheber | .......... B27N 3/14 141/131 |
| 3,028,287 A | * | 4/1962 | Greten | ..................... B27N 3/14 19/302 |

(Continued)

FOREIGN PATENT DOCUMENTS

| GB | 872710 | 7/1961 | | |
| GB | 872710 A | * | 7/1961 | ............... B27N 3/14 |

(Continued)

OTHER PUBLICATIONS

International Search Report and Written Opinion dated Jan. 14, 2016 from International Patent Application No. PCT/IB2015/057833, filed Oct. 13, 2015.

*Primary Examiner* — Terrell H Matthews
(74) *Attorney, Agent, or Firm* — Sunstone IP

(57) ABSTRACT

A system for production of panels, particularly for the production of panels made of wood flakes comprising at least a support plane movable along a direction of forward movement, at least a first and a second forming machine arranged in succession to one another along the direction of forward movement above the support plane and each comprising at least a first set of distributor elements rotatable around respective axes, the distributor elements being able to select a flow of wooden material comprising short flakes and long flakes so as to allow the fall of the short flakes on the support plane and the dragging of the long flakes, where the first forming machine and the second forming machine comprise at least a second set of distributor elements operable independently of the relative first set and where the distributor elements of the first set are operable in rotation in both directions.

8 Claims, 2 Drawing Sheets

(51) Int. Cl.
*B07B 1/14* (2006.01)
*E04C 2/16* (2006.01)

(58) Field of Classification Search
USPC .................. 209/517, 518, 621, 632, 659
See application file for complete search history.

(56) References Cited

U.S. PATENT DOCUMENTS

| | | | | |
|---|---|---|---|---|
| 4,836,388 A * | 6/1989 | Bielagus | .................. | B07B 1/15 |
| | | | | 198/382 |
| 6,834,764 B2 * | 12/2004 | Kreft | ...................... | D21B 1/023 |
| | | | | 209/667 |
| 7,004,300 B2 * | 2/2006 | Bossler | .................. | B27N 3/143 |
| | | | | 144/361 |
| 2016/0297096 A1 * | 10/2016 | Nijsse | ...................... | B27N 3/14 |

FOREIGN PATENT DOCUMENTS

| | | | | |
|---|---|---|---|---|
| WO | 95/10402 A1 | 4/1995 | | |
| WO | WO-9510402 A1 * | 4/1995 | ............... | B27N 1/00 |

* cited by examiner

SYSTEM FOR THE PRODUCTION OF PANELS MADE OF WOOD FLAKES

CROSS REFERENCE TO RELATED APPLICATIONS

This application is a U.S. National Stage Entry of International Patent Application No. PCT/IB2015/057833, filed Oct. 13, 2015, which claims the benefit of Italian Patent Application No. IT MO2014A000283, filed Oct. 13, 2014, the disclosures of which are hereby incorporated entirely herein by reference.

BACKGROUND

Technical Field

The present invention relates to a system for the production of panels of wooden material, particularly of wood flakes.

Background Art

It is known that to make this type of panel, the raw material, i.e. wood, must be treated in special production facilities where all the phases and treatments occur needed to transform the raw material into panels. The most important macro phases are briefly described below.

In a first macro phase, elongated wood flakes are obtained by shaving treatments.

In a second macro phase, the wood flakes are first dried, usually in special drum or belt dryers, selected and then mixed with resins and glues.

In a third macro phase, the panel is formed.

In particular, the flow of wooden material is conveyed to special forming machines, which also make a kind of selection of the incoming material by separating it into two flake flows substantially homogeneous in size (short flakes and long flakes).

Selection is made by means of swivel distributor elements, sized and arranged in such a way as to drag the long flakes causing them to advance along a direction defined by their direction of rotation and in such a way that the flakes fall in succession onto the conveyor belt arranged below the distributor elements themselves, and arrange themselves in different layers according to their size.

This way the flows of material thus deposited on the conveyor belt are layered one above the other with the flakes oriented according to requirements, so as to form a multi-layer mattress of material.

The mattress is then sent to heat presses which heat and compact the material, activating the glues and resins previously applied to the flakes and giving the panel its final thickness.

The known panels, called Oriented Strand Board (OSB), usually consist of at least three layers of wooden material in flakes, of which the outermost layers consist of long flakes and the innermost ones of short flakes.

These panels do have several drawbacks.

This type of panel is mainly used for structural applications and in the shipbuilding sector and is not suitable for applications wherein the aesthetic appearance is of substantial importance.

Moreover, this type of panel is not even suitable for "facing", i.e., to be treated with waterproofing substances and coated with fine powders, varnishes, paper or other material in order to give the panel a better aesthetic appearance such as to make it suitable for a broader range of applications.

In particular, because the outer layers are made up of the longest flakes, gaps left between one flake and another are larger than gaps present in the intermediate layers.

The presence of such gaps on the outermost layers implies that such panels are not suitable for facing because the surface finish would be inaccurate and of poor quality.

To perform the facing of this type of panels, large quantities of material would have to be applied which would cause an increase both in production costs, because such material has a far from negligible cost, and in the unit weight of the panel, due to the fact that because the material is fine, it will have a considerable weight per unit of volume.

This would entail a considerable increase in the density of the panel, an undesirable feature if this type of panel has to compete, e.g., with the multiply panel which instead has a low density.

Another drawback associated with the extensive use of material used in the outer coating regards the environmental impact which each panel would have, both during the production phase, because fine powders and varnishes are impacting substances, and during transport, because the greater the weight, the greater will be the emissions associated with fuel consumption.

SUMMARY

The main aim of the present invention is to provide a system that allows making panels of flake wooden material which have the outer layers made up of the short flakes of the incoming material.

This type of panels is indicated with the name of Light Strand Board (LSB). Within this aim, one object of the present invention is to provide a system which allows producing low-density panels which, on the outside, have short-flake layers and on the inside long-flake layers, having in any case characteristics in compliance with the parameters required by international product standards.

One object of the present invention is to make panels of wooden material which are comparable, as regards structure, mechanical properties and density, to multiply panels and which, compared to the latter, at the same time enable more effective exploitation of the trunk of wood.

Another object is to provide a system which allows making both OSB panels and LSB panels switching from one procedure to another in a simple and automatic way, and in just a short time.

Another object of the present invention is to provide a system which allows to overcome the mentioned drawbacks of the prior art within the ambit of a simple, rational, easy, effective to use and low cost solution.

The objects stated above are achieved by the present system having the characteristics of claim 1.

BRIEF DESCRIPTION OF THE DRAWINGS

Other characteristics and advantages of the present invention will become better evident from the description of a preferred but not exclusive embodiment of a system for the production of panels, illustrated by way of an indicative, but non-limiting, example in the accompanying drawings, wherein.

EMBODIMENTS OF THE INVENTION

Figure 1:
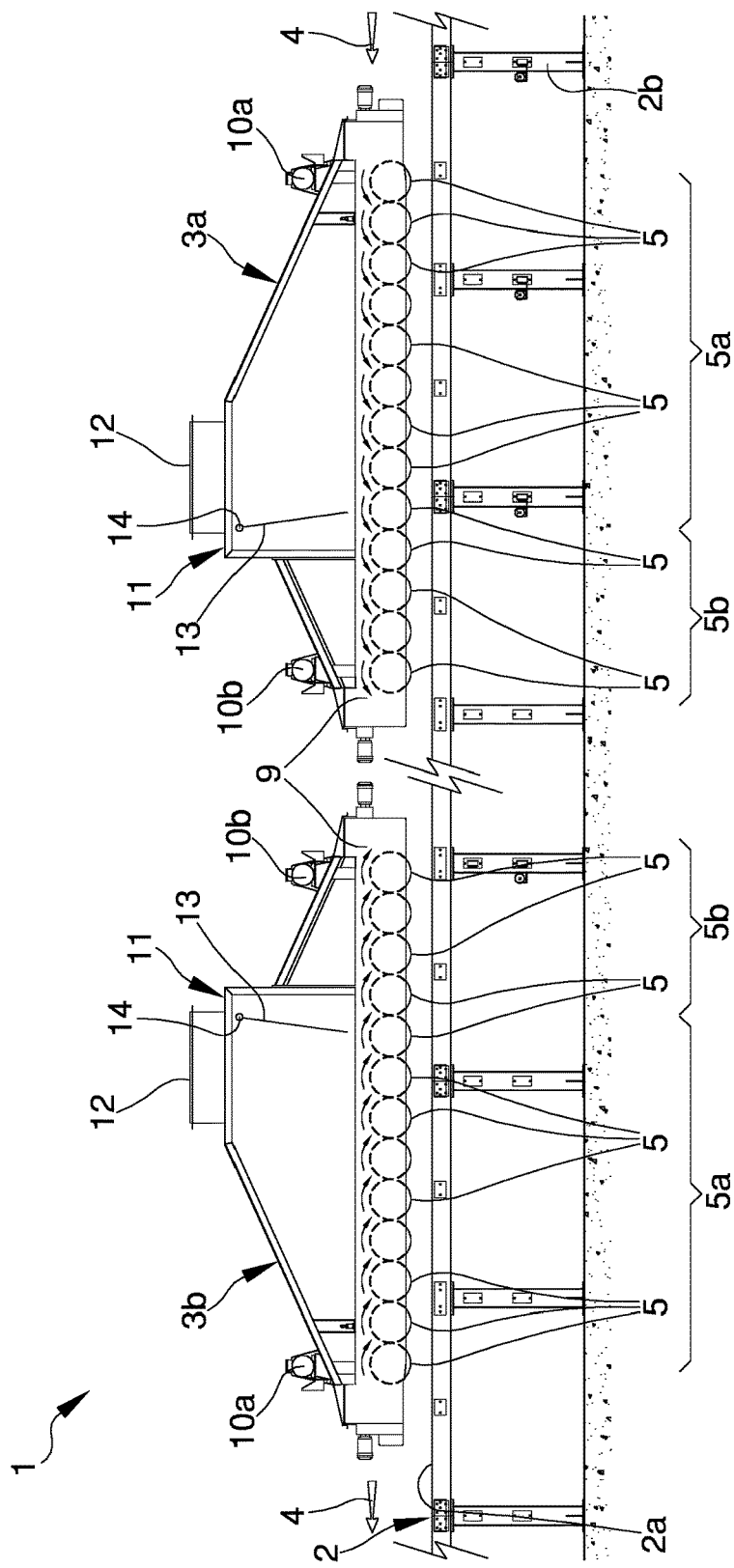
FIG. 1 is a schematic view of the system according to the invention.

With particular reference to such illustrations, reference number 1 globally designates a system for the production of panels of wooden material, particularly for the production of panels of wood flakes.

The system 1 for the production of panels comprises at least a support plane 2 movable along a direction 4 of forward movement.

The support plane 2 is made up e.g. of a conveyor belt 2a placed on a sustaining structure 2b.

The system 1 also comprises at least a first and a second forming machine 3a, 3b arranged in succession to one another along the direction 4 of forward movement.

These are placed above the support plane 2 and each comprise at least a first set 5a of distributor elements 5 rotatable around the respective axes.

The distributor elements 5 are able to select a flow of wooden material 6, 7 comprising short flakes 6 and long flakes 7, so as to allow the fall of the short flakes 6 on the support plane 2 and the dragging of the long flakes 7 above the distributor elements 5.

The long flakes 7 are then dragged by the distributor elements 5 along a direction of movement defined by the direction of rotation of the upper portions of the distributor elements themselves with which they come in contact.

The distributor elements 5 have a disc shape or the like, and are keyed on rotating shafts 8 which constitute, precisely, the axis of rotation thereof.

Figure 2:
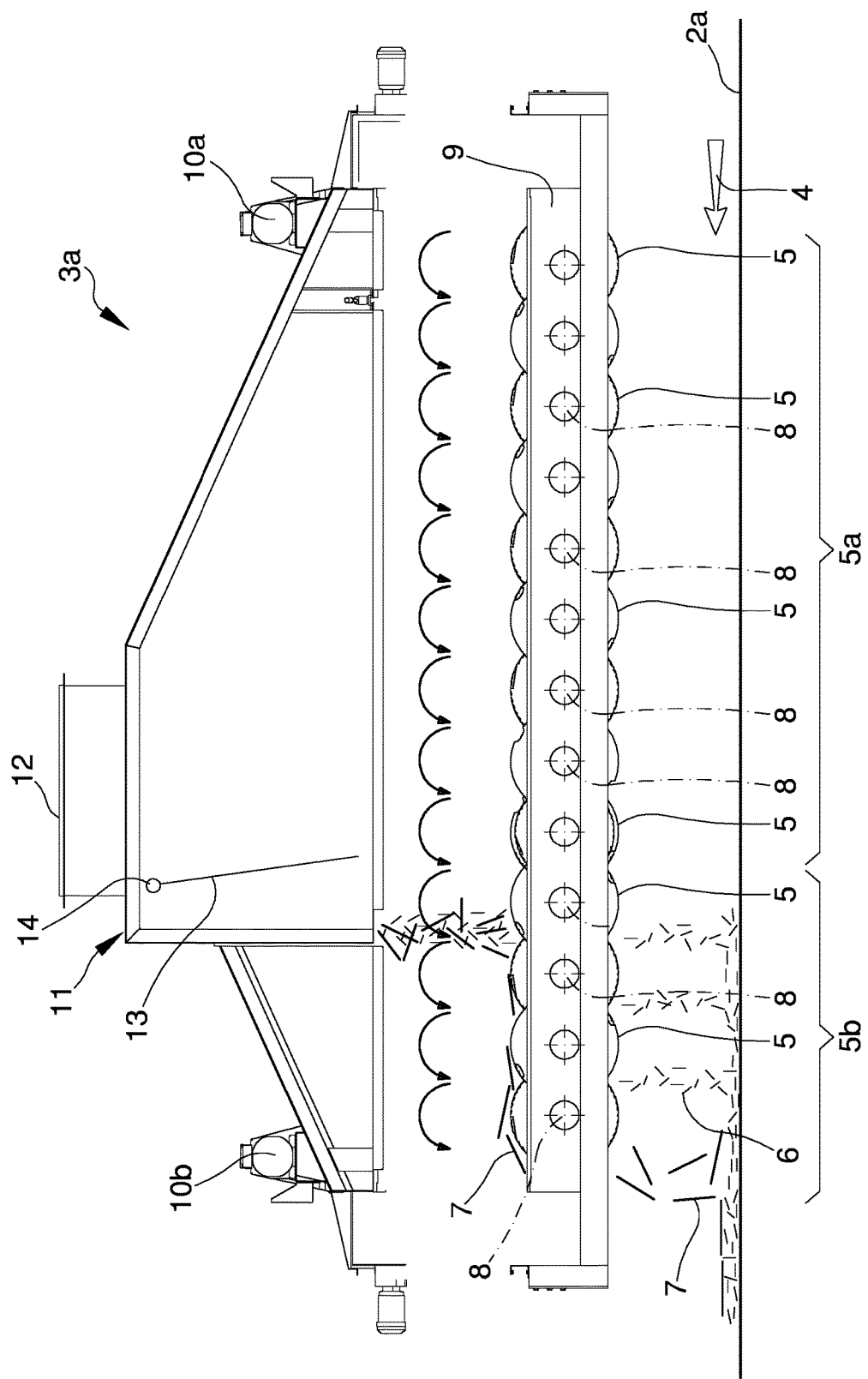
FIG. 2 is a partial exploded view of a forming machine of the system of FIG. 1.

In the embodiment shown in FIGS. 1 and 2, the rotating shafts 8 are supported by a base frame 9 and the distributor elements 5 have axes of rotation substantially horizontal and lying on an upper plane parallel to the support plane 2.

FIG. 2 shows a forming machine 3a with a partially exploded view wherein the base frame 9 is separated from the upper portion of the machine to highlight the distributor elements 5.

In this embodiment, the distributor elements 5 comprise discs spaced apart according to the length of reference of the long flakes for which the selection is to be made. According to this length of reference, the flow of material which hits the distributor elements 5 is divided into a flow of short flakes 6, i.e., those with a length shorter than the length of reference, and into a flow of long flakes 7, i.e., those with a length longer than the length of reference.

The short flakes 6 have a length such as not to be dragged above the distributor elements 5 and therefore cross these and fall onto the conveyor belt 2a.

The long flakes 7, on the other hand, have a length such as to be dragged over the rotating elements and, before falling onto the conveyor belt 2a, they advance to the end of the set of distributor elements 5.

Alternative embodiments cannot however be ruled out wherein the distributor elements 5 comprise elements spaced and shaped in a different way (half-discs, gearwheels, cams, etc.) or alternative configurations.

According to the invention, the first and second forming machines 3a, 3b comprise at least one second set 5b of distributor elements 5 which can be operated independently from the relative first set 5a.

Furthermore, the distributor elements 5 of the first set 5a can be operated in rotation in both directions.

With reference to the direction 4 shown in FIGS. 1 and 2, the distributor elements 5 which move the long flakes 7 in a discordant direction rotate clockwise, while the distributor elements 5 which move the long flakes 7 in a concordant direction rotate anti-clockwise.

More in detail, at least one of the forming machines 3a, 3b is operable alternately between a first work configuration and a second work configuration.

In the first work configuration the distributor elements 5 of the sets 5a, 5b of the first and second machines 3a, 3b rotate in a concordant and discordant way, respectively, to the direction 4 of forward movement of the belt.

In the embodiment illustrated in the figures, in the first work configuration, the distributor elements 5 of the first machine 3a rotate in an anti-clockwise direction, while the distributor elements 5 of the second machine 3b rotate in a clockwise direction. In this first configuration, the distributor elements 5 of the first and second sets 5a, 5b of each machine 3a, 3b, therefore, rotate in a direction concordant with each other and the wooden material is selected and distributed in such a way as to form LSB panels.

In the second work configuration, the distributor elements 5 of the first set 5a of the first and second machines 3a, 3b rotate in a discordant and concordant way, respectively, to the direction 4 of forward movement of the belt and the distributor elements 5 of the second set 5b are stationary (meaning with this term that these distributor elements do not actively participate to the distribution of wood flakes and, therefore, to the making of the panel; therefore it is not ruled out that the distributor elements 5 of the second set 5b can rotate passively, i.e. without being invested by the flow of wooden material).

In the present embodiment, in the second work configuration, the distributor elements 5 of the first machine 3a rotate in a clockwise direction, while the distributor elements 5 of the second machine 3b rotate in an anticlockwise direction; the wooden material is then selected and distributed so as to form OSB panels.

At least one of the forming machines 3a, 3b comprises first and second motor means 10a, 10b associated with the first and second sets 5a, 5b respectively, and operable independently of one another to put in rotation the relative distributor elements 5.

This way, the operation of the machines can be alternated in order to make both OSB panels and LSB panels.

In the present embodiment, the forming machines 3a, 3b are two and are placed in a specular manner with respect to one another, so as to realize two symmetrical pairs of overlapping layers intended to form the panel.

Embodiments cannot however be ruled out comprising several forming machines arranged in a different way so as to make panels with several layers and flakes positioned differently.

At least one of the forming machines 3a, 3b comprises at least a collecting vessel 11 able to receive the flow of material 6, 7 and conveying means 13, 14 able to send the flow of material 6, 7 towards the distributor elements 5.

At the top portion of the collecting vessel 11 an opening 12 is obtained able to allow the entry of the flow of material 6, 7 into the collecting vessel 11.

Preferably, the material to be treated comes from an upper storage bunker, is fluidized by means of a set of combs or rotary cutters on the fall front and falls by gravity inside the collecting vessel 11.

Alternative embodiments cannot be ruled out wherein two or more forming machines are fed with material coming from a single supply bunker.

Alternative embodiments cannot be ruled out wherein the opening 12 is placed e.g. on a side opening.

The conveying means 13, 14 comprise at least a partition element 13 able to deflect the flow of material 6, 7 towards at least one of the first and second sets 5a, 5b.

The partition element 13 is hinged on a fulcrum 14 to the collecting vessel 11 and its position is adjustable in a discrete or continuous way depending on where the flow of material 6, 7 is to be conveyed.

In particular, the partition element 13 is fixed inside of the collecting vessel 11 and is hinged on a fulcrum 14 along the entire width of the machine 3a or 3b so as to direct the fall of the flow of material 6, 7 inside the forming machine.

Conveniently, removable fixing means are provided, not shown in the illustrations, able to block the angular position of the partition element 13 according to the process, type and size parameters of the wooden material, etc.

In the present embodiment, the conveying means 13, 14 are arranged above the distributor elements 5, so as to advantageously exploit the force of gravity to drop the wooden material.

Alternative solutions cannot however be ruled out.

The operation of the present invention is as follows.

With reference to the first forming machine 3a of FIG. 2, the flow of material 6, 7 coming from the previous processing phases, is conveyed to the distributor elements 5 through the collecting structure 11.

In the case of production of panels with outer layer consisting of short flakes 6 (LSB), the distributor elements 5 are active according to the first work configuration, i.e., with both sets 5a and 5b operating.

The flow of material 6, 7 which reaches the distributor elements 5 is separated into two flows: a flow of short flakes 6 and a flow of long flakes 7.

More particularly, the short flakes 6 drop through the distributor elements 5 and go to form a first layer above the conveyor belt 2a.

The long flakes 7, instead, are conveyed by the distributor elements 5 as far as the end of the second set 5b, in a direction concordant with the forward direction 4, and, subsequently, made to fall on top of the first layer so as to form a second layer of long flakes 7 which is superimposed on the aforementioned first layer.

These first two layers of material constitute one outer layer and one inner layer of the panel being made respectively.

The conveyor belt 2a continues its operation, conveying these first two layers underneath the second forming machine 3b, where a perfectly identical operation is performed with a second incoming flow of material 6, 7 which is conveyed onto the distributor elements 5 so as to form the other two layers required to complete the panel.

Because the second forming machine 3b is positioned in a specular way to the first, in this case the first layer to form and fall over the first two transiting layers is that of the long flakes 7, subsequently covered with a final layer of short flakes 6.

In particular, the long flakes 7 are conveyed by the distributor elements 5 as far as the end of the second set 5b and in a direction discordant with the forward direction and, subsequently, made to fall over the first two layers so as to form a third layer of long flakes 7.

The short flakes 6, instead, fall through the distributor elements 5 and go to make up a fourth layer which superimposes on the aforementioned third layer.

In the case of production of OSB panels, the distributor elements 5 are active according to the second work configuration, i.e., with the first set 5a functioning and the second set 5b stationary.

The selection of the material and the formation of the layers takes place by means of a process totally identical with that described previously, while they differ in terms of the direction of rotation of the distributor elements 5 of the first sets 5a which is reversed in both forming machines 3a, 3b with respect to what has been described above.

It has in practice been ascertained how the described invention achieves the proposed objects and in particular the fact is underlined that the system allows making panels, the outer layers of which are made up of short flakes.

At the same time, the system forming the subject of the present invention is flexible to use and operate, since, thanks to the simultaneous presence in each machine of the first and second set, it also allows producing OSB boards switching from one mode to another in a simple and fast manner.

The invention claimed is:

1. A system for the production of panels, particularly for the production of panels made of wood flakes, comprising:
   at least a support plane movable along a direction of forward movement;
   at least a first and a second forming machine comprising at least a collecting vessel able to receive a flow of wooden material and conveying means able to send said flow of wooden material towards distributor elements, said forming machines being arranged in succession to one another along said direction of forward movement above said support plane and each comprising at least a first set of distributor elements rotatable around respective axes, said distributor elements being able to select said flow of wooden material comprising short flakes and long flakes;
   wherein said first forming machine and said second forming machine comprise at least a second set of distributor elements operable independently of the relative first set and by the fact that the distributor elements of said first set are operable in rotation in both directions, and
   wherein said distributor elements comprise elements spaced apart according to the length of reference of said long flakes for which the selection is to be made so as to allow the short flakes to cross said distributor elements and to fall on said support plane, and the long flakes to be dragged over said distributor elements and, before falling onto said support plane, to be advanced to the end of said set of distributor elements.

2. The system according to claim 1, wherein at least one of said forming machines is operable alternately between a first work configuration, wherein the distributor elements of the first set of said first and second machines rotate in a common and different direction, respectively, to the direction of forward movement of the belt, and a second work configuration wherein the distributor elements of the first set of said first and second machines rotate in a common and different direction, respectively, to the direction of forward movement of the belt and the distributor elements of said second set are stationary.

3. The system according to claim 1, wherein at least one of said forming machines comprises first and second motor means associated with said first and with said second sets, respectively, and operable independently of one another to put in rotation the relative distributor elements.

4. The system according to claim 1, wherein at least one of said forming machines comprises at least a collecting vessel able to receive said flow of material and conveying means able to send said flow of material towards said distributor elements.

5. The system according to claim 4, wherein said conveying means comprise at least a partition element able to deflect said flow of material towards at least one of said first and second sets.

6. The system according to claim 5, wherein said partition element has a first extremity hinged on a fulcrum to said collecting vessel.

7. The system according to claim 5, further comprising removable fixing means configured to block the angular position of said partition element.

8. The system according to claim 4, wherein said conveying means are arranged above said second set of distributor elements.

* * * * *